United States Patent
Shimoyama et al.

(10) Patent No.: US 11,442,041 B2
(45) Date of Patent: Sep. 13, 2022

(54) SENSOR INCLUDING DEFORMABLE PARTS

(71) Applicants: The University of Tokyo, Tokyo (JP); KABUSHIKI KAISHA TOSHIBA, Tokyo (JP)

(72) Inventors: Isao Shimoyama, Bunkyo Tokyo (JP); Minh Dung Nguyen, Bunkyo Tokyo (JP); Thanh-Vinh Nguyen, Bunkyo Tokyo (JP); Takanori Usami, Bunkyo Tokyo (JP); Kazuo Watabe, Yokohama Kanagawa (JP); Takahiro Omori, Kawasaki Kanagawa (JP); Kiyoshi Matsumoto, Chiyoda Tokyo (JP)

(73) Assignees: THE UNIVERSITY OF TOKYO, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/018,478

(22) Filed: Sep. 11, 2020

(65) Prior Publication Data
US 2020/0408721 A1 Dec. 31, 2020

Related U.S. Application Data

(63) Continuation of application No. PCT/JP2018/041843, filed on Nov. 12, 2018.

(51) Int. Cl.
*G01N 29/14* (2006.01)
(52) U.S. Cl.
CPC ................... *G01N 29/14* (2013.01)

(58) Field of Classification Search
CPC ........................................ G01N 29/14
See application file for complete search history.

(56) References Cited

U.S. PATENT DOCUMENTS

2007/0230721 A1 10/2007 White et al.
2015/0362394 A1 12/2015 Shimoyama et al.
2016/0327523 A1 11/2016 Shimoyama et al.

FOREIGN PATENT DOCUMENTS

JP  WO2015/111581 A1  7/2015
JP  6021110 B2  11/2016

*Primary Examiner* — Natalie Huls
*Assistant Examiner* — Cynthia L Davis
(74) *Attorney, Agent, or Firm* — Finnegan, Henderson, Farabow, Garrett & Dunner, L.L.P.

(57) ABSTRACT

According to one embodiment, a sensor includes first and second structure bodies, and a detector. The first structure body includes a supporter, and first and second deformable parts supported by the supporter. The second deformable part has at least one of a second length less than a first length of the first deformable part, a second width greater than a first width of the first deformable part, a second thickness greater than a first thickness of the first deformable part, a second Young's modulus greater than a first Young's modulus of the first deformable part, or a second spring constant greater than a first spring constant of the first deformable part. The second structure body is connected to the first structure body. A liquid is provided between the first and second structure bodies. The detector outputs a signal corresponding to a deformation of the first or second deformable part.

21 Claims, 11 Drawing Sheets

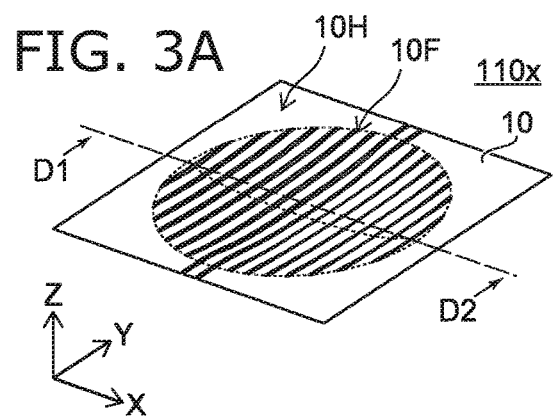
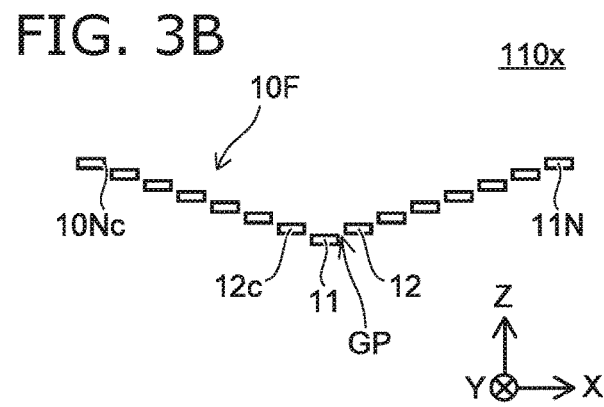
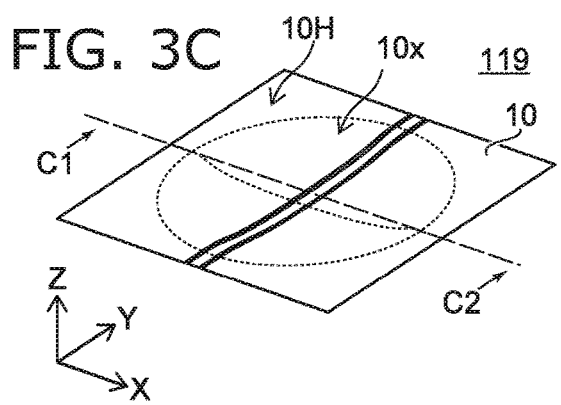
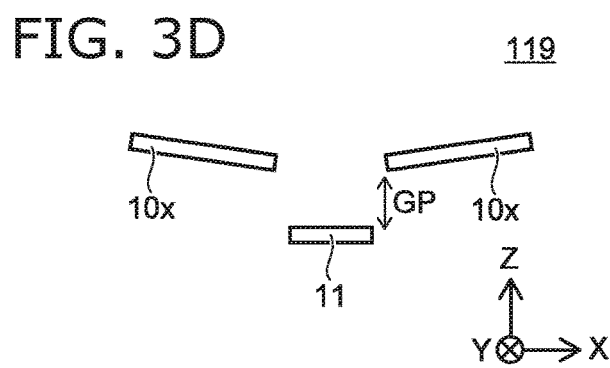
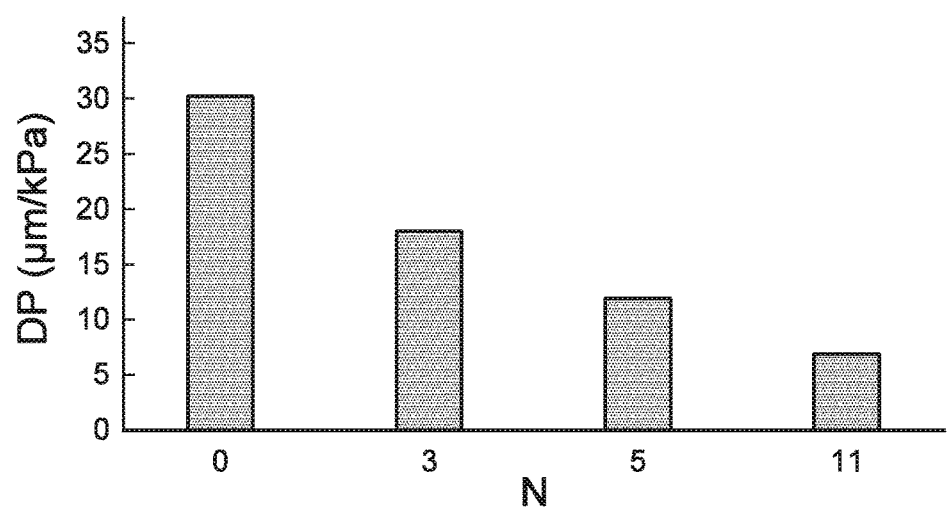
FIG. 4

SENSOR INCLUDING DEFORMABLE PARTS

CROSS-REFERENCE TO RELATED APPLICATIONS

This is a continuation application of International Application PCT/JP2018/041843, filed on Nov. 12, 2018; the entire contents of which are incorporated herein by reference.

FIELD

Embodiments of the invention generally relate to a sensor.

BACKGROUND

For example, an AE (Acoustic Emission) sensor is used to detect vibrations in the acoustic and ultrasonic bands. AE is, for example, an elastic wave in the ultrasonic band generated by the occurrence and/or propagation of a crack. For example, the AE sensor is used in fatigue/degradation diagnosis, a non-destructive inspection, etc. It is desirable to stabilize the characteristics of the sensor.

BRIEF DESCRIPTION OF THE DRAWINGS

FIGS. 3A to 3D are schematic views illustrating characteristics of sensors;

FIG. 4 is a graph illustrating characteristics of the sensors;

DETAILED DESCRIPTION

Figure 1A:
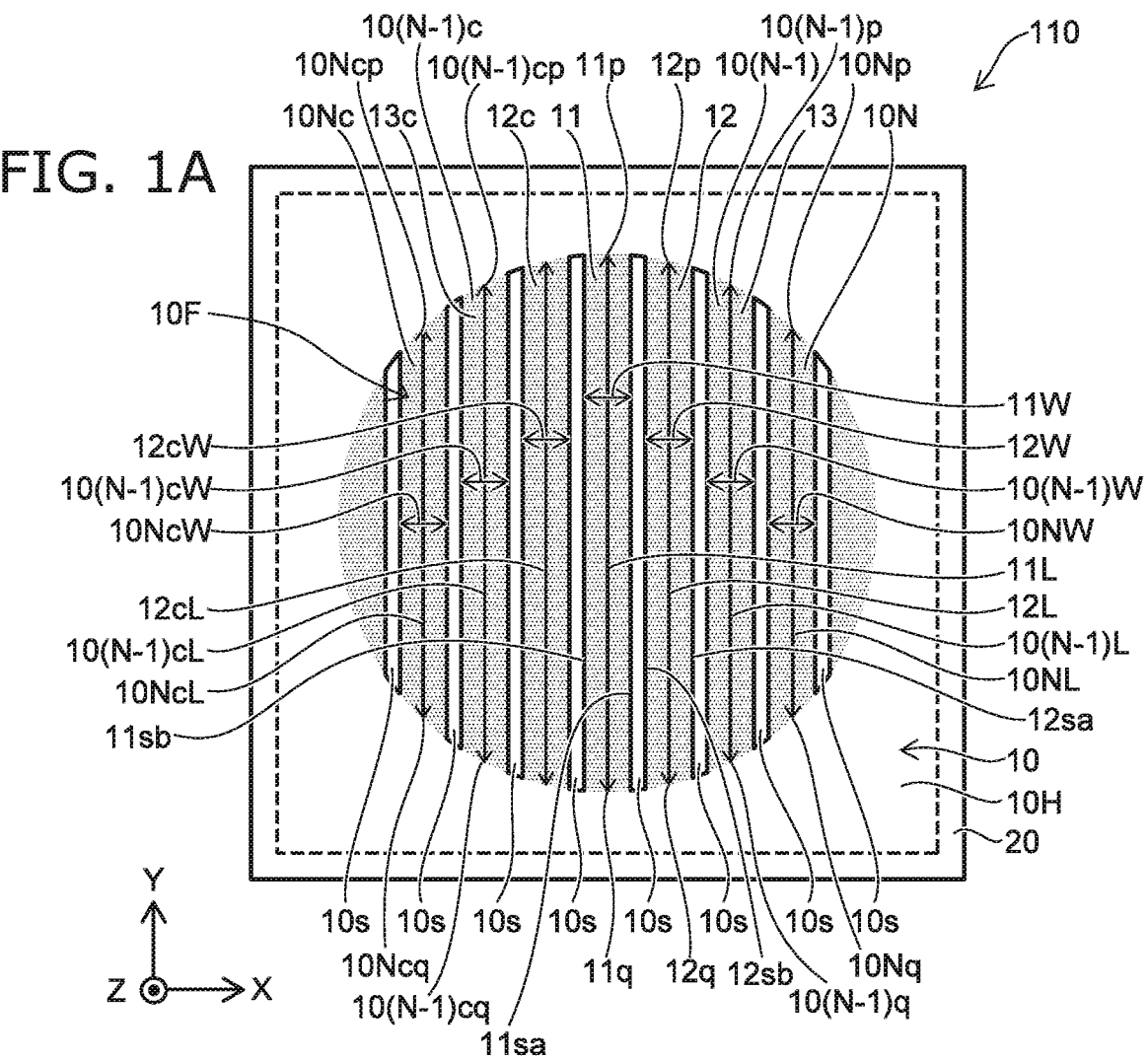
FIGS. 1A and 1B are schematic views illustrating a sensor according to a first embodiment.

According to one embodiment, a sensor includes a first structure body, a second structure body, and a detector. The first structure body includes a supporter, a first deformable part, and a second deformable part. The first deformable part is supported by the supporter. The second deformable part is supported by the supporter. The second deformable part has at least one of a second length less than a first length of the first deformable part, a second width greater than a first width of the first deformable part, a second thickness greater than a first thickness of the first deformable part, a second Young's modulus greater than a first Young's modulus of the first deformable part, or a second spring constant greater than a first spring constant of the first deformable part. The second structure body is connected to the first structure body. A liquid is provided between the first structure body and the second structure body. The detector outputs a signal corresponding to a deformation of at least one of the first deformable part or the second deformable part.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIGS. 1A, 1B, 2A, and 2B are schematic views illustrating a sensor according to a first embodiment.

Figure 1B:
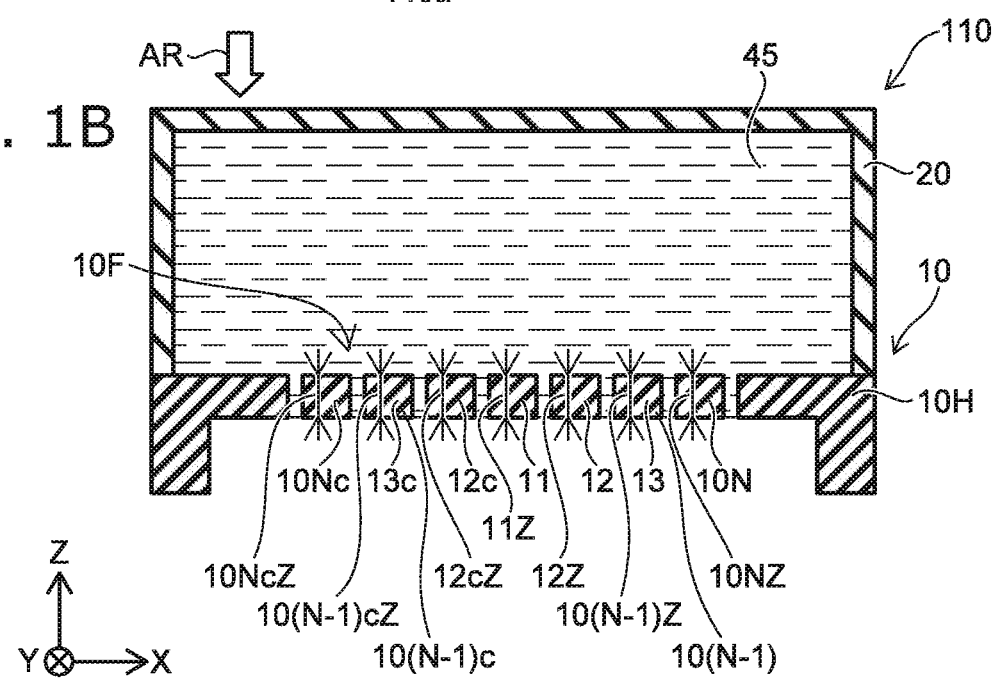
Figure 2A:
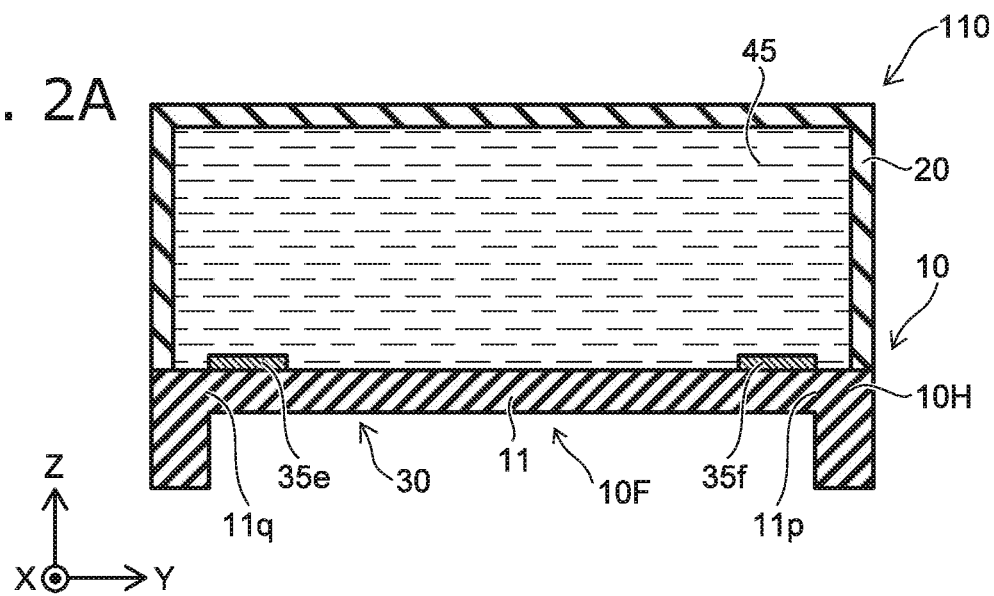
FIGS. 2A and 2B are schematic views illustrating the sensor according to the first embodiment.
Figure 2B:
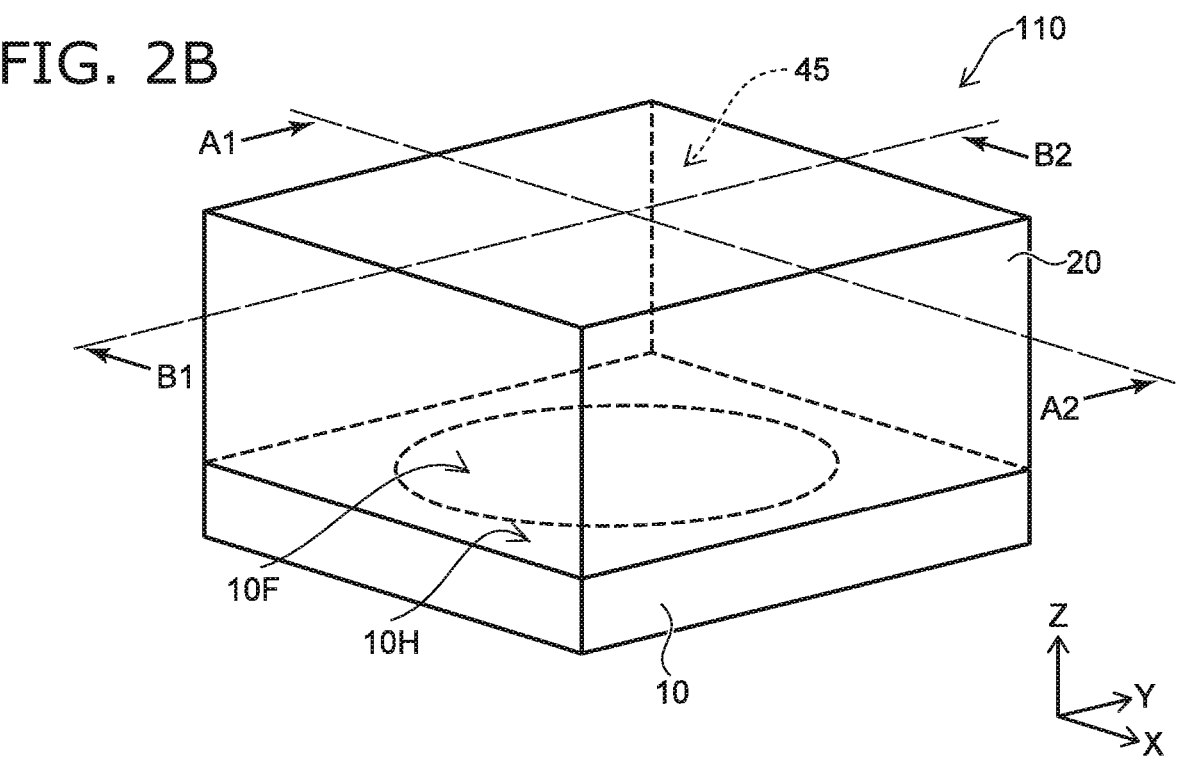

FIG. 1A is a plan view of a portion of the sensor when viewed along arrow AR of FIG. 1B. FIG. 1B is a line A1-A2 cross-sectional view of FIG. 2B. FIG. 2A is a line B1-B2 cross-sectional view of FIG. 2B. FIG. 2B is a perspective view.

The sensor 110 according to the embodiment includes a first structure body 10, a second structure body 20, and a detector 30.

As shown in FIG. 1B, the second structure body 20 is connected to the first structure body 10. A liquid 45 is provided between the first structure body 10 and the second structure body 20. The second structure body 20 is, for example, a container. The sensor 110 is, for example, an acoustic sensor. For example, the sensor 110 detects vibrations in the acoustic and ultrasonic bands. For example, the sensor 110 detects AE. AE is, for example, an elastic wave in the ultrasonic band generated by the occurrence and/or propagation of a crack. For example, the sensor 110 is used as a sensor to detect AE. For example, the sensor 110 is used in a fatigue/degradation diagnosis to detect the occurrence of a micro defect. For example, the sensor 110 is used in a non-destructive inspection, etc.

FIG. 1A illustrates the first structure body 10. The liquid 45 is not illustrated in FIG. 1A.

As shown in FIGS. 1A and 1B, the first structure body 10 includes a supporter 10H and multiple deformable parts. The multiple deformable parts are, for example, flexible parts. The multiple deformable parts are, for example, beams. The multiple deformable parts include, for example, a first deformable part 11, a second deformable part 12, etc.

The first deformable part 11, the second deformable part 12, etc., are supported by the supporter 10H. For example, the second deformable part 12 extends along the first deformable part 11. For example, the first deformable part 11 and the second deformable part 12 may be any two of the multiple deformable parts. The multiple deformable parts are, for example, at least a portion of a membrane part 10F.

The first deformable part 11 has a first length 11L, a first width 11W, and a first thickness 11Z. The first length 11L is greater than the first width 11W. The first length 11L is greater than the first thickness 11Z. The first deformable part 11 is, for example, stripe-shaped. For example, the first deformable part 11 extends along a first direction.

The first direction is taken as a Y-axis direction. One direction perpendicular to the Y-axis direction is taken as an X-axis direction. A direction perpendicular to the Y-axis direction and the X-axis direction is taken as a Z-axis direction.

The second deformable part 12 has a second length 12L, a second width 12W, and a second thickness 12Z. The second length 12L is greater than the second width 12W. The second length 12L is greater than the second thickness 12Z. For example, the second deformable part 12 also is stripe-shaped. For example, the second deformable part 12 extends along the first direction (in the example, the Y-axis direction).

In the example, the second length 12L is less than the first length 11L. In the example, the second width 12W is substantially equal to the first width 11W. In the example, the second thickness 12Z is substantially equal to the first thickness 11Z.

As described below, the second deformable part 12 may have at least one of the second length 12L that is less than the first length 11L, the second width 12W that is greater than the first width 11W, or the second thickness 12Z that is greater than the first thickness 11Z.

The multiple deformable parts (e.g., the first deformable part 11, the second deformable part 12, etc.) are deformable. For example, an external force is applied to the second structure body 20 (e.g., the container). The external force is, for example, a sound wave, etc. At least one of the multiple deformable parts deforms according to the external force. For example, the surface of the liquid 45 is displaced due to the external force, and at least one of the multiple deformable parts deforms according to the displacement.

The detector 30 (referring to FIG. 2A) outputs a signal corresponding to the deformation of at least one of the first deformable part 11 or the second deformable part 12.

The signal that is output from the detector 30 includes at least one of a change of a resistance occurring according to the deformation described above, a change of a voltage of piezoelectricity occurring according to the deformation described above, or a change of an electrostatic capacitance occurring according to the deformation described above.

In the example shown in FIG. 2A, the detector 30 includes a first electrode 35e and a second electrode 35f. In the example, the first electrode 35e is connected to a portion of the first deformable part 11. The second electrode 35f is connected to another portion of the first deformable part 11.

The multiple deformable parts include, for example, crystals. For example, a change of the resistance according to the deformation occurs in at least a portion of the multiple deformable parts. For example, a voltage is generated according to the deformation in at least a portion of the multiple deformable parts. For example, a change of the electrostatic capacitance may occur according to the deformation in at least a portion of the multiple deformable parts. For example, these changes can be detected using the electrodes described above, etc.

For example, light may be irradiated on at least one of the multiple deformable parts. For example, the deformation of the multiple deformable parts may be detected by detecting reflected light from the multiple deformable parts.

As described above, the first deformable part 11 and the second deformable part 12 are provided in the sensor 110 according to the embodiment. As described above, the second deformable part 12 has at least one of the second length 12L that is less than the first length 11L, the second width 12W that is greater than the first width 11W, or the second thickness 12Z that is greater than the first thickness 11Z. Thereby, the second deformable part 12 deforms less easily than the first deformable part 11. The first deformable part 11 deforms more easily than the second deformable part 12. The deformations of the first and second deformable parts 11 and 12 include Z-axis direction components. The second deformable part 12 may have a second Young's modulus that is greater than a first Young's modulus of the first deformable part 11. The second deformable part 12 may have a second spring constant that is greater than a first spring constant of the first deformable part 11.

On the other hand, there is a reference example in which the first deformable part 11 is provided, but a second deformable part 12 such as that described above is not provided. In the reference example, a Z-axis direction gap at a slit 10s at the side of the first deformable part 11 between the first deformable part 11 and another portion becomes excessively large when the first deformable part 11 deforms. Therefore, the liquid 45 easily outflows from the Z-axis direction gap between the first deformable part 11 and the other portion.

Conversely, in the embodiment, the second deformable part 12 is provided at the side of the first deformable part 11 with the slit 10s interposed. The second deformable part 12 deforms less easily than the first deformable part 11, but is deformable along the Z-axis direction. Therefore, for example, compared to the reference example described above, the Z-axis direction gap between the first deformable part 11 and the second deformable part 12 is small in the embodiment. Because the Z-axis direction gap is small, the outflow of the liquid 45 from the gap can be suppressed. The liquid 45 can be sufficiently held. The fluctuation of the characteristics can be suppressed. According to the embodiment, a sensor can be provided in which the characteristics can be stable.

Examples of the length in the Z-axis direction of the slit 10s described above are described below.

In the example as shown in FIG. 1A, the first structure body 10 further includes a second counter deformable part 12c. The second counter deformable part 12c also is supported by the supporter 10H. The second counter deformable part 12c also extends along the first deformable part 11. At least a portion of the first deformable part 11 is provided between the second deformable part 12 and the second counter deformable part 12c.

The second counter deformable part 12c has a second counter length 12cL, a second counter width 12cW, and a second counter thickness 12cZ. The second counter length 12cL is greater than the second counter width 12cW. The second counter length 12cL is greater than the second counter thickness 12cZ.

The second counter deformable part 12c may have at least one of a second counter Young's modulus that is greater than the first Young's modulus of the first deformable part 11 or a second counter spring constant that is greater than the first spring constant of the first deformable part 11.

The second counter deformable part 12c may have at least one of the second counter length 12cL that is less than the first length 11L, the second counter width 12cW that is greater than the first width 11W, the second counter thickness 12cZ that is greater than the first thickness 11Z, the second counter Young's modulus that is greater than the first Young's modulus of the first deformable part 11, or the second counter spring constant that is greater than the first spring constant of the first deformable part 11.

By providing such a second counter deformable part 12c, the Z-axis direction gap in the slit 10s at the second counter deformable part 12c side of the first deformable part 11 can be small when the first deformable part 11 deforms. Because the gap is small, the outflow of the liquid 45 from the gap can be suppressed. For example, the liquid 45 can be sufficiently held. The fluctuation of the characteristics can be suppressed.

As shown in FIG. 1A, the first length 11L is the length of the first deformable part 11 along the first direction. In the example, the first direction is the Y-axis direction. The second length 12L is the length of the second deformable part 12 along the first direction. For example, when the length of the first deformable part 11 along the first direction changes, the first length 11L may be the average length of the first deformable part 11. For example, when the length of the second deformable part 12 along the first direction changes, the second length 12L may be the average length of the second deformable part 12.

A second direction from the first deformable part 11 toward the second deformable part 12 crosses the first direction. In the example, the second direction is the X-axis direction. The first width 11W is the length of the first deformable part 11 along the second direction. The second width 12W is the length of the second deformable part 12 along the second direction. For example, when the length of the first deformable part 11 along the second direction changes, the first width 11W may be the average width of the first deformable part 11. For example, when the length of the second deformable part 12 along the second direction changes, the second width 12W may be the average width of the second deformable part 12.

A third direction crosses a plane (e.g., the X-Y plane) including the first direction described above and the second direction described above. In the example, the third direction is the Z-axis direction. The first thickness 11Z is the length of the first deformable part 11 along the third direction. The second thickness 12Z is the length of the second deformable part 12 along the third direction. For example, when the length of the first deformable part 11 along the third direction changes, the first thickness 11Z may be the average thickness of the first deformable part 11. For example, when the thickness of the second deformable part 12 along the third direction changes, the second thickness 12Z may be the average thickness of the second deformable part 12.

As shown in FIG. 1A, the first deformable part 11 includes two first side portions (a side portion 11sa and a side portion 11sb). The two first side portions extend along the first direction (in the example, the Y-axis direction). The two first side portions are separated from the supporter 10H and separated from the second deformable part 12.

The second deformable part 12 includes two second side portions (a side portion 12sa and a side portion 12sb). The two second side portions extend along the first direction (in the example, the Y-axis direction). The two second side portions are separated from the supporter 10H and separated from the first deformable part 11.

Thus, the multiple deformable parts (the first to Nth deformable parts 11 to 10N and the second to Nth counter deformable parts 12c to 10Nc) have stripe configurations along the first direction.

The first structure body 10 has the slit 10s provided between the first deformable part 11 and the second deformable part 12. The first structure body 10 has a slit (any slit 10s) provided between the second deformable part 12 and the supporter 10H. The slit 10s extends along the first direction (e.g., the Y-axis direction).

The multiple deformable parts are, for example, "fixed beams".

For example, a first end portion 11p of the first deformable part 11 is supported by the supporter 10H. A first other-end portion 11q of the first deformable part 11 is supported by the supporter 10H. A second end portion 12p of the second deformable part 12 is supported by the supporter 10H. A second other-end portion 12q of the second deformable part 12 is supported by the supporter 10H.

The direction from the first other-end portion 11q toward the first end portion 11p is along the first direction (in the example, the Y-axis direction). The direction from the second other-end portion 12q toward the second end portion 12p is along the first direction.

As shown in FIG. 1A, for example, a third deformable part 13, a third counter deformable part 13c, etc., may be provided. Thus, in the embodiment, the first structure body 10 may include the Nth deformable part 10N that is supported by the supporter 10H. "N" is, for example, an integer of 3 or more. The (N−1)th deformable part 10(N−1) is between the first deformable part 11 and the Nth deformable part 10N. The Nth deformable part 10N extends along the (N−1)th deformable part 10(N−1). For example, the Nth deformable part 10N extends along the first direction (in the example, the Y-axis direction).

The slit 10s is provided between the first deformable part 11 and the second deformable part 12. The slit 10s is provided between the Nth deformable part 10N and the (N−1)th deformable part 10(N−1).

The (N−1)th deformable part 10(N−1) has a (N−1)th length 10(N−1)L, a (N−1)th width 10(N−1)W, and a (N−1)th thickness 10(N−1)Z. The (N−1)th length 10(N−1)L is greater than the (N−1)th width 10(N−1)W and greater than the (N−1)th thickness 10(N−1)Z.

The Nth deformable part 10N has an Nth length 10NL, an Nth width 10NW, and an Nth thickness 10NZ. The Nth length 10NL is greater than the Nth width 10NW and greater than the Nth thickness 10NZ.

For example, the Nth deformable part 10N has at least one of the Nth length 10NL that is less than the (N−1)th length 10(N−1)L, the Nth width 10NW that is greater than the (N−1)th width 10(N−1)W, or the Nth thickness 10NZ that is greater than the (N−1)th thickness 10(N−1)Z.

In the embodiment, the first structure body 10 may include an Nth counter deformable part 10Nc that is supported by the supporter 10H. The first deformable part 11 is between the Nth deformable part 10N and the Nth counter deformable part 10Nc. A (N−1)th counter deformable part 10(N−1)c is between the first deformable part 11 and the Nth counter deformable part 10Nc. The Nth counter deformable part 10Nc extends along the (N−1)th counter deformable part 10(N−1)c. The slit 10s is provided between the Nth counter deformable part 10Nc and the (N−1)th counter deformable part 10(N−1)c.

The (N−1)th counter deformable part 10(N−1)c has a (N−1)th counter length 10(N−1)cL, a (N−1)th counter width 10(N−1)cW, and a (N−1)th counter thickness 10(N−1)cZ. The (N−1)th counter length 10(N−1)cL is greater than the (N−1)th counter width 10(N−1)cW and greater than the (N−1)th counter thickness 10(N−1)cZ.

The Nth counter deformable part 10Nc has an Nth counter length 10NcL, an Nth counter width 10NcW, and an Nth counter thickness 10NcZ. The Nth counter length 10NcL is greater than the Nth counter width 10NcW and greater than the Nth counter thickness 10NcZ.

For example, the Nth counter deformable part 10Nc has at least one of the Nth counter length 10NcL that is less than the (N−1)th counter length 10(N−1)cL, the Nth counter width 10NcW that is greater than the (N−1)th counter width 10(N−1)cW, or the Nth counter thickness 10NcZ that is greater than the (N−1)th counter thickness 10(N−1)cZ.

When "N" is 4, the (N−1)th deformable part 10(N−1)c is, for example, the third deformable part 13. When "N" is 4, the (N−1)th counter deformable part 10(N−1)c is, for example, the third counter deformable part 13c.

In the embodiment, at least one of the length, the width, or the thickness may be different between any two deformable parts. For example, the "first deformable part" may be the (N−1)th deformable part 10(N−1), and the "second deformable part" may be the Nth deformable part 10N. The "first deformable part" may be the (N−2)th deformable part 10(N−2), and the "second deformable part" may be the Nth deformable part 10N.

In one example, the lengths of the multiple deformable parts decrease in order from the first deformable part 11 toward the Nth deformable part 10N. For example, the widths of the multiple deformable parts increase in order from the first deformable part 11 toward the Nth deformable part 10N. For example, the thicknesses of the multiple deformable parts increase in order from the first deformable part 11 toward the Nth deformable part 10N.

In one example, the lengths of the multiple deformable parts decrease in order from the first deformable part 11 toward the Nth counter deformable part 10Nc. For example, the widths of the multiple deformable parts increase in order from the first deformable part 11 toward the Nth counter deformable part 10Nc. For example, the thicknesses of the multiple deformable parts increase in order from the first deformable part 11 toward the Nth counter deformable part 10Nc.

For example, an Nth end portion 10Np of the Nth deformable part 10N is supported by the supporter 10H. An Nth other-end portion 10Nq of the Nth deformable part 10N is supported by the supporter 10H. The direction from the Nth other-end portion 10Nq toward the Nth end portion 10Np is along the first direction. The Nth deformable part 10N has a stripe configuration along the first direction (e.g., the Y-axis direction).

For example, an Nth counter end portion 10Ncp of the Nth counter deformable part 10Nc is supported by the supporter 10H. An Nth counter other-end portion 10Ncq of the Nth counter deformable part 10Nc is supported by the supporter 10H. The direction from the Nth counter other-end portion 10Ncq toward the Nth counter end portion 10Ncp is along the first direction. The Nth counter deformable part 10Nc has a stripe configuration along the first direction (e.g., the Y-axis direction).

For example, a (N−1)th end portion 10(N−1)p of the (N−1)th deformable part 10(N−1) is supported by the supporter 10H. A (N−1)th other-end portion 10(N−1)q of the (N−1)th deformable part 10(N−1) is supported by the supporter 10H. The direction from the (N−1)th other-end portion 10(N−1)q toward the (N−1)th end portion 10(N−1)p is along the first direction. The (N−1)th deformable part 10(N−1) has a stripe configuration along the first direction (e.g., the Y-axis direction).

For example, a (N−1)th counter end portion 10(N−1)cp of the (N−1)th counter deformable part 10(N−1)c is supported by the supporter 10H. A (N−1)th counter other-end portion 10(N−1)cq of the (N−1)th counter deformable part 10(N−1)c is supported by the supporter 10H. The direction from the (N−1)th counter other-end portion 10(N−1)cq toward the (N−1)th counter end portion 10(N−1)cp is along the first direction. The (N−1)th counter deformable part 10(N−1)c has a stripe configuration along the first direction (e.g., the Y-axis direction).

By such a configuration, for example, the distance in the Z-axis direction (the gap along the Z-axis direction) can be small between two multiple deformable parts adjacent to each other.

Examples of the distance in the Z-axis direction (the gap along the Z-axis direction) for the multiple deformable parts will now be described.

FIGS. 3A to 3D are schematic views illustrating characteristics of sensors.

FIGS. 3A and 3C correspond to perspective views of the first structure body 10. FIG. 3B corresponds to a cross-sectional view of the first structure body 10 in a line D1-D2 cross section of FIG. 3A. FIG. 3D corresponds to a cross-sectional view of the first structure body 10 in a line C1-C2 cross section of FIG. 3C. These drawings show examples of simulation results relating to the deformation of the first structure body 10.

FIGS. 3A and 3B correspond to a sensor 110x. The sensor 110x is the sensor 110 in which "N" is 7. FIGS. 3C and 3D correspond to a sensor 119. In the sensor 119, the first deformable part 11 is provided, but the other deformable parts (e.g., the beams) are not provided. In the sensor 119, the first deformable part 11 is provided between two membrane parts 10x. Slits are not provided in the two membrane parts 10x. The sensor 110x corresponds to one sensor of the embodiment. The sensor 119 corresponds to a reference example.

In the sensor 119 as shown in FIG. 3D, a large gap GP occurs between the first deformable part 11 and the membrane part 10x when the first deformable part 11 deforms. For example, the membrane part 10x does not easily deform. Conversely, the first deformable part 11 easily deforms. The large gap GP occurs because the ease of the deformation is large. There is a possibility that the liquid 45 may outflow from the large gap GP.

Conversely, in the sensor 110x as shown in FIG. 3B, the gap GP is small between the adjacent multiple deformable parts when the first deformable part 11 deforms. It is considered that this is due to the small difference of the ease of deformation between the adjacent multiple deformable parts. The outflow of the liquid 45 from the gap GP is suppressed.

FIG. 4 is a graph illustrating characteristics of the sensors.

The horizontal axis of FIG. 4 is "N". "N" being 0 corresponds to the sensor 119 described above. The vertical axis is a parameter DP (μm/kPa). The parameter DP corresponds to the length in the Z-axis direction of the gap GP occurring between the first deformable part 11 and the second deformable part 12 when a pressure of 1 kPa is applied to the second structure body 20. When "N" is 0 (the sensor 119), the parameter DP corresponds to the length in the Z-axis direction of the gap GP occurring between the first deformable part 11 and the membrane part 10x when a pressure of 1 kPa is applied to the second structure body 20.

For one "N", the widths of the multiple deformable parts, the width of the slit 10s between the multiple deformable parts, and the thicknesses of the multiple deformable parts are constant. The width of the slit 10s is constant between the multiple "N". The planar shape of the membrane formed of the multiple deformable parts is substantially circular. The lengths of the deformable parts decrease from the center of the membrane toward the X-axis direction ends (referring to FIG. 1A).

As shown in FIG. 4, the parameter DP decreases as "N" increases. For example, when "N" is 3, the parameter DP is about 60% of the parameter DP when "N" is 0.

Several examples of sensors according to the embodiment will now be described. Portions that are different from those of the sensor 110 will be described.

Figure 5:
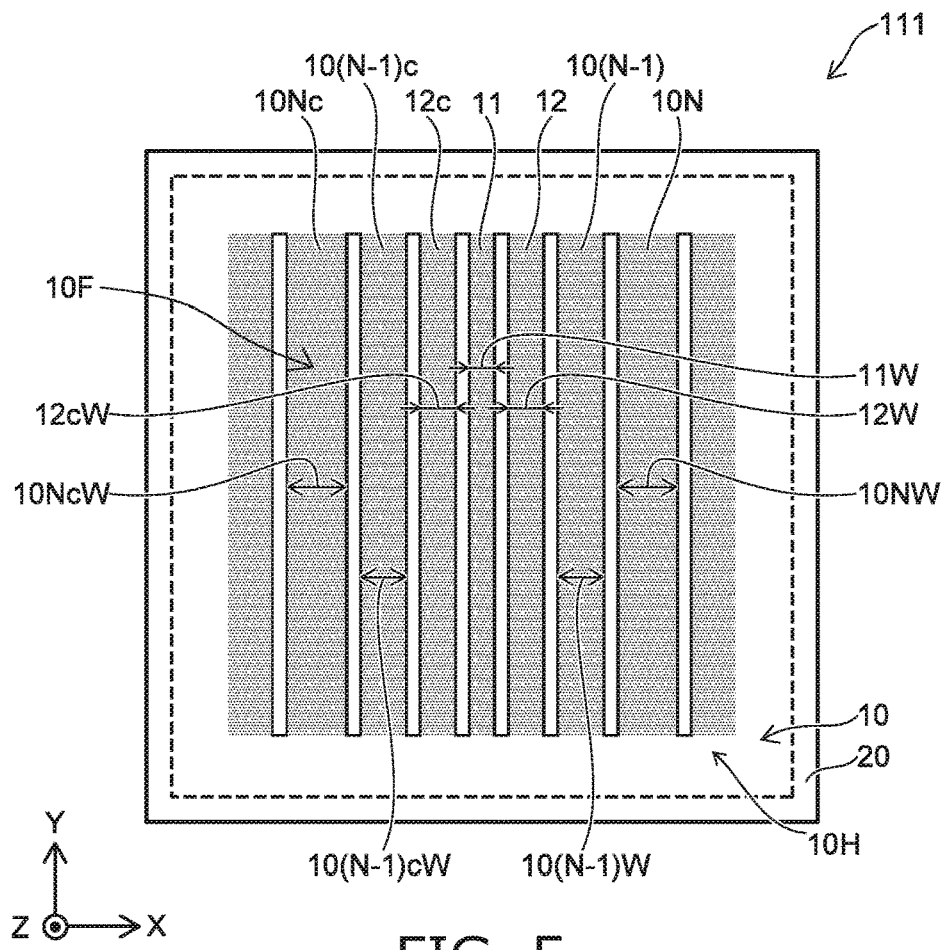
FIG. 5 is a schematic plan view illustrating a portion of a sensor according to the first embodiment.

FIG. 5 is a schematic plan view illustrating a portion of a sensor according to the first embodiment.

FIG. 5 corresponds to FIG. 1A. As shown in FIG. 5, the widths of the multiple deformable parts are different from each other in the sensor 111 according to the embodiment.

In the sensor 111, the second width 12W is greater than the first width 11W. The second counter width 12cW is greater than the first width 11W.

For example, the Nth width 10NW is greater than the (N−1)th width 10(N−1)W. For example, the Nth counter width 10NcW is greater than the (N−1)th counter width 10(N−1)cW.

In the sensor 111 as well, the length in the Z-axis direction of the gap GP can be small. The outflow of the liquid 45 from the gap GP is suppressed thereby. A sensor can be provided in which the characteristics can be stable.

Figure 6:
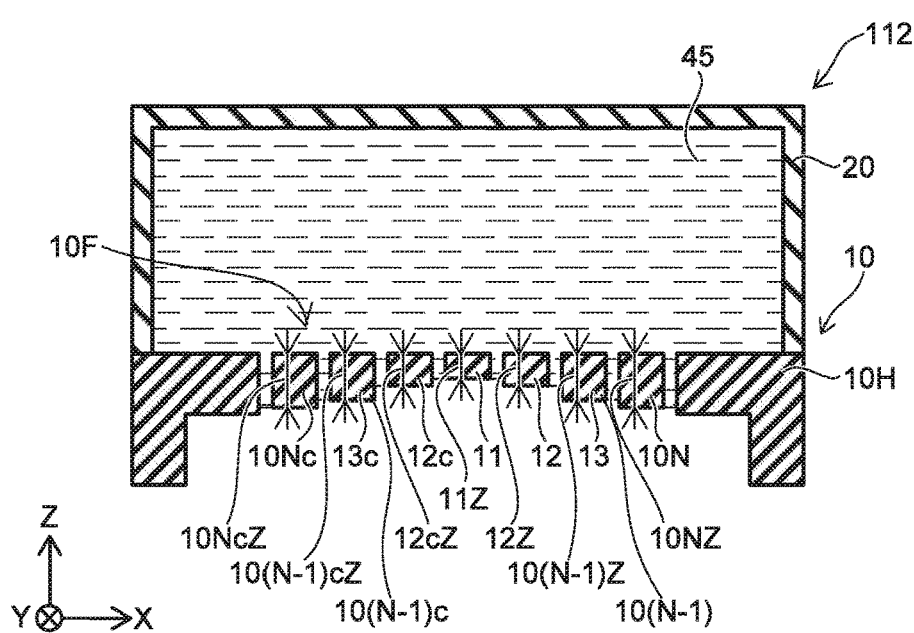
FIG. 6 is a schematic cross-sectional view illustrating a portion of a sensor according to the first embodiment.

FIG. 6 is a schematic cross-sectional view illustrating a portion of a sensor according to the first embodiment.

FIG. 6 corresponds to FIG. 1B. As shown in FIG. 6, the thicknesses of the multiple deformable parts are different from each other in the sensor 112 according to the embodiment.

In the sensor 112, the second thickness 12Z is greater than the first thickness 11Z. The second counter thickness 12cZ is greater than the first thickness 11Z.

For example, the Nth thickness 10NZ is greater than the (N−1)th thickness 10(N−1)Z. For example, the Nth counter thickness 10NcZ is greater than the (N−1)th counter thickness 10(N−1)cZ.

In the sensor 112 as well, the length in the Z-axis direction of the gap GP can be small. The outflow of the liquid 45 from the gap GP is suppressed thereby. A sensor can be provided in which the characteristics can be stable.

Figure 7:
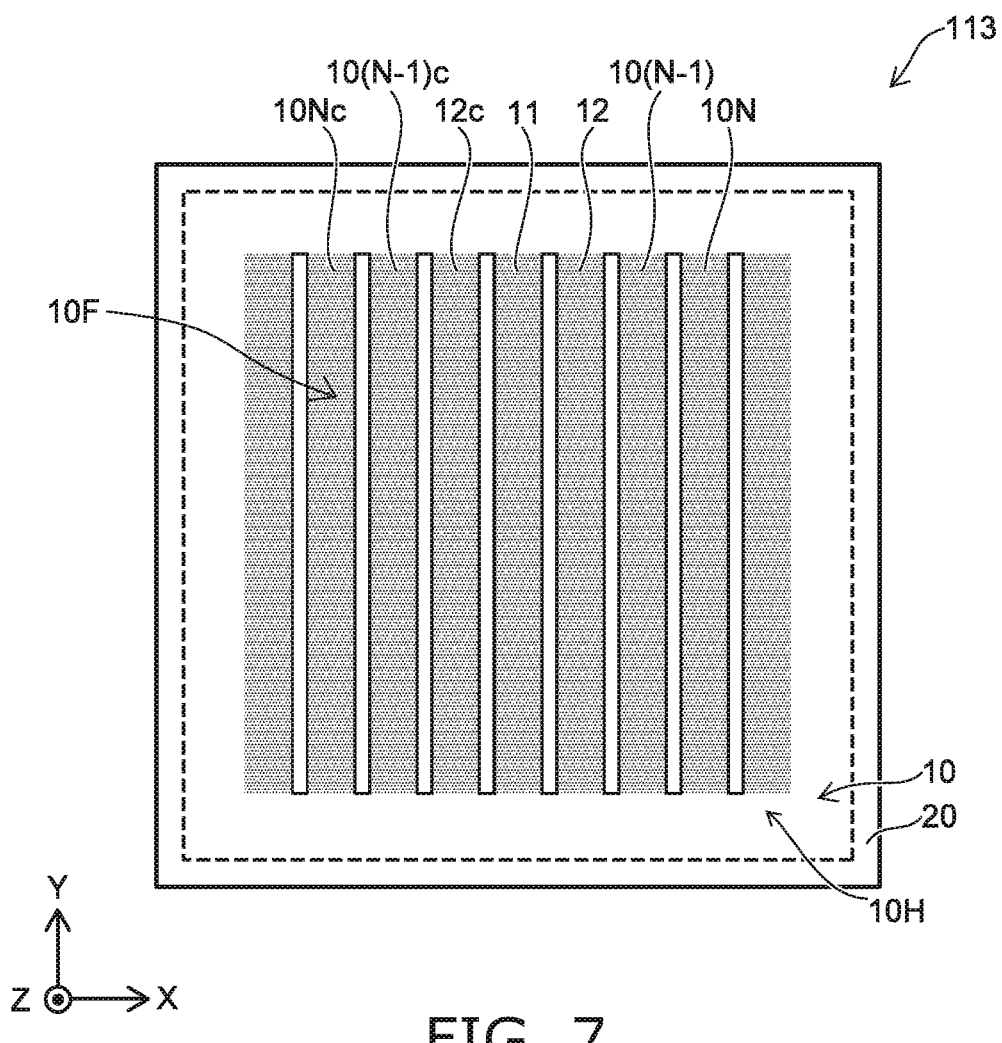
FIG. 7 is a schematic cross-sectional view illustrating a portion of a sensor according to the first embodiment.

FIG. 7 is a schematic cross-sectional view illustrating a portion of a sensor according to the first embodiment.

FIG. 7 corresponds to FIG. 1A. The Young's moduli of the multiple deformable parts are different from each other in the sensor 113 according to the embodiment. The spring constants of the multiple deformable parts may be different from each other. In the example, for example, the Young's moduli are different and/or the spring constants are different due to differences of the materials.

In the sensor 113, for example, the second Young's modulus of the second deformable part 12 is greater than the first Young's modulus of the first deformable part 11.

For example, the Young's modulus of the Nth width 10NW is greater than the Young's modulus of the (N−1)th width 10(N−1)W. For example, the Young's modulus of the Nth counter width 10NcW is greater than the Young's modulus of the (N−1)th counter width 10(N−1)cW.

In the sensor 113, for example, the second spring constant of the second deformable part 12 is greater than the first spring constant of the first deformable part 11.

For example, the spring constant of the Nth width 10NW is greater than the spring constant of the (N−1)th width 10(N−1)W. For example, the spring constant of the Nth counter width 10NcW is greater than the spring constant of the (N−1)th counter width 10(N−1)cW.

In the sensor 113 as well, the length in the Z-axis direction of the gap GP can be small. The outflow of the liquid 45 from the gap GP is suppressed thereby. A sensor can be provided in which the characteristics can be stable.

In the embodiment, for example, the second deformable part 12 may have at least one of the second length 12L that is less than the first length 11L of the first deformable part 11, the second width 12W that is greater than the first width 11W of the first deformable part 11, the second thickness 12Z that is greater than the first thickness 11Z of the first deformable part 11, the second Young's modulus that is greater than the first Young's modulus of the first deformable part 11, or the second spring constant that is greater than the first spring constant of the first deformable part 11.

Thus, in the embodiment, at least one of the lengths of the multiple deformable parts, the widths of the multiple deformable parts, the thicknesses of the multiple deformable parts, the Young's moduli of the multiple deformable parts, or the spring constants of the multiple deformable parts may be mutually modified. For example, the Young's modulus or the spring constant may be modified by using different materials.

In the sensor 110, the shape (the planar shape) formed of the boundaries between the supporter 10H and the first to Nth deformable parts 11 to 10N and the boundaries between the supporter 10H and the second to Nth counter deformable parts 12c to 10Nc is substantially circular. The planar shape may be polygonal.

For example, one of the multiple deformable parts has a beam-like shape. For example, for the first deformable part 11, the first length 11L is not less than 2 times and not more than 100 times the first width 11W. For example, the first length 11L is not less than 100 times and not more than 3000 times the first thickness 11Z. For example, the Nth length 10NL is not less than 2 times and not more than 100 times the Nth width 10NW. For example, the Nth length 10NL is not less than 100 times and not more than 3000 times the Nth thickness 10NZ.

The length, the width, the thickness, the Young's modulus, or the spring constant may change within one of the multiple deformable parts. Practically, in such a case, the average value of the value that changes may be used as the length, the width, the thickness, the Young's modulus, or the spring constant of the one of the multiple deformable parts.

Figure 8:
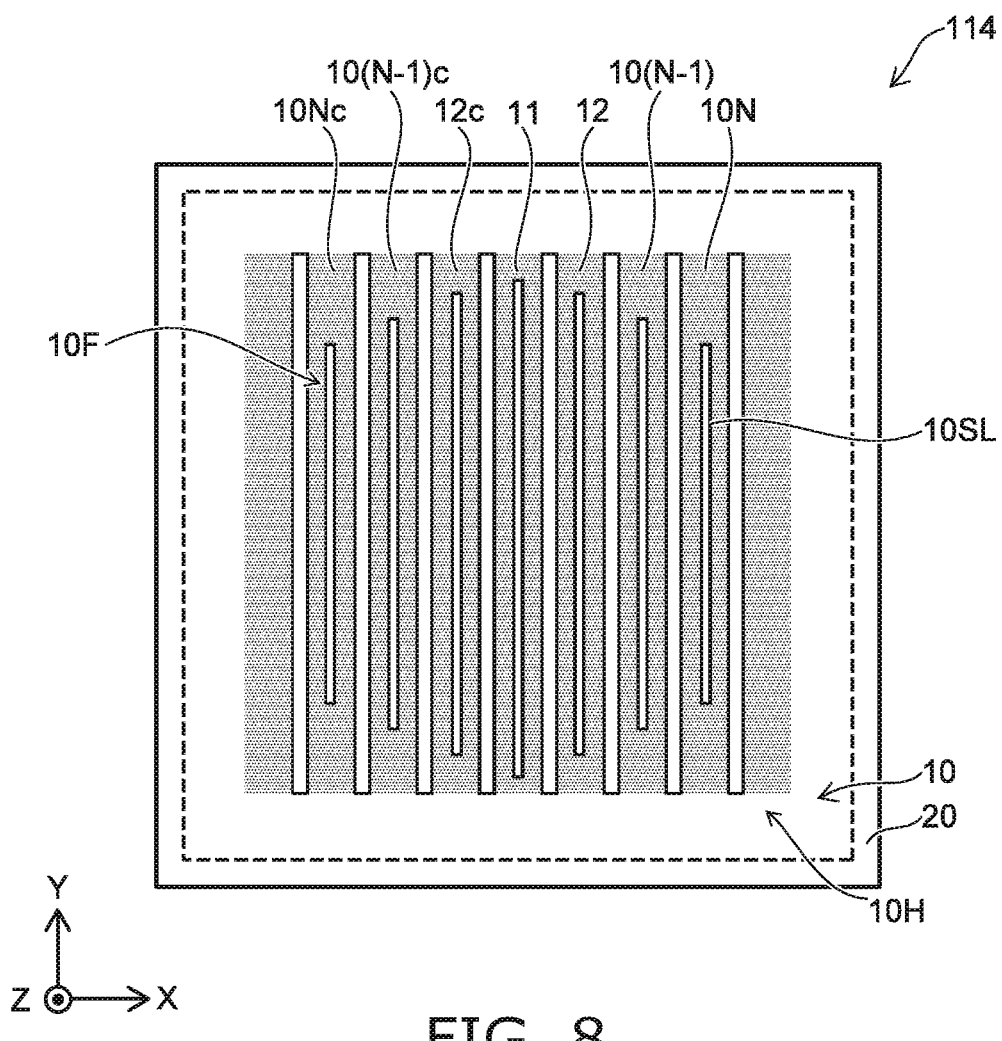
FIG. 8 is a schematic cross-sectional view illustrating a portion of a sensor according to the first embodiment.

FIG. 8 is a schematic cross-sectional view illustrating a portion of a sensor according to the first embodiment.

FIG. 8 corresponds to FIG. 1A.

As shown in FIG. 8, at least one of the multiple deformable parts includes a hole 10SL in the sensor 114 according to the embodiment. In the example, the length of the hole 10SL in the first deformable part 11 is greater than the length of the hole 10SL in the second deformable part 12. In the embodiment, the spring constant may be modified by the hole provided in the deformable part. For example, the spring constant decreases as the hole 10SL becomes larger. The spring constant decreases as the number of the holes 10SL increases. The spring constants of the multiple deformable parts may be different from each other due to the holes 10SL.

In the embodiment, the detector 30 may be provided for at least one of the multiple deformable parts. Multiple detectors 30 may be provided. The detectors 30 may be separated from the deformable parts.

Second Embodiment

Portions of a sensor according to a second embodiment that are different from those of the sensor according to the first embodiment will now be described.

Figure 9:
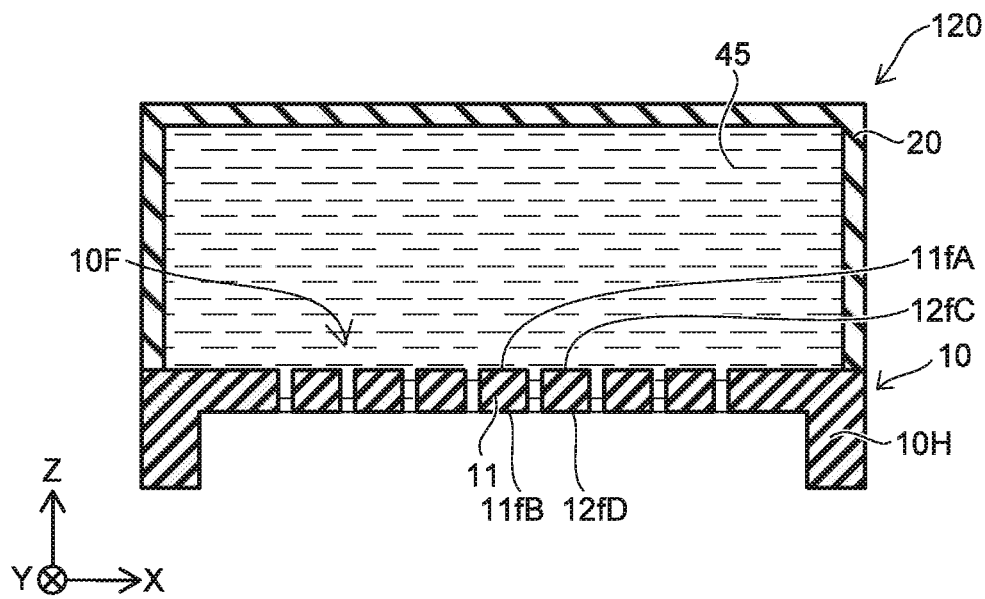
FIG. 9 is a schematic cross-sectional view illustrating a portion of a sensor according to a second embodiment.

FIG. 9 is a schematic cross-sectional view illustrating a portion of the sensor according to the second embodiment.

FIG. 9 corresponds to FIG. 1B. As shown in FIG. 9, the characteristics of two surfaces of the multiple deformable parts are mutually modified in the sensor 120 according to the embodiment.

For example, the first deformable part 11 includes a first surface 11fA and a second surface 11fB. The first surface 11fA is between the second surface 11fB and the liquid 45. The first surface 11fA is the surface at the liquid 45 side. The second surface 11fB is, for example, the surface at the side opposite to the first surface 11fA.

In the embodiment, the contact angle of the second surface 11fB with the liquid 45 is greater than the contact angle of the first surface 11fA with the liquid 45. The contact angles described above are, for example, the advancing contact angles.

The wettability of the second surface 11fB with the liquid 45 is low. For example, compared to the first surface 11fA, the second surface 11fB is highly hydrophobic. Therefore, the outflow of the liquid 45 via the slit 10s can be suppressed. A sensor can be provided in which the characteristics can be stable.

In the embodiment, the contact angle of the side surface of the first deformable part 11 with the liquid 45 may be greater than the contact angle of the first surface 11fA with the liquid 45.

For example, the second deformable part 12 includes a third surface 12fC and a fourth surface 12fD. The third surface 12fC is between the fourth surface 12fD and the liquid 45. The contact angle of the fourth surface 12fD with the liquid 45 is greater than the contact angle of the third surface 12fC with the liquid 45.

Thus, the contact angle with the liquid 45 may be modified between two surfaces of the multiple deformable parts.

For example, the contact angle of the second surface 11fB with the liquid 45 can be set to be greater than the contact angle of the first surface 11fA with the liquid 45 by surface treatment of the second surface 11fB. The surface treatment may include, for example, processing using a compound including fluorine (e.g., $C_4F_8$ gas, etc.).

Thus, the sensor 120 according to the second embodiment includes the first structure body 10, the second structure body 20, and the detector 30. The second structure body 20 is connected to the first structure body 10. The liquid 45 is provided between the first structure body 10 and the second structure body 20.

The first structure body 10 includes the supporter 10H, and the first deformable part 11 that is supported by the supporter 10H. The first deformable part 11 includes the first surface 11fA and the second surface 11fB. The first surface 11fA is between the second surface 11fB and the liquid 45. The contact angle of the second surface 11fB with the liquid 45 is greater than the contact angle of the first surface 11fA with the liquid 45.

Figure 10:
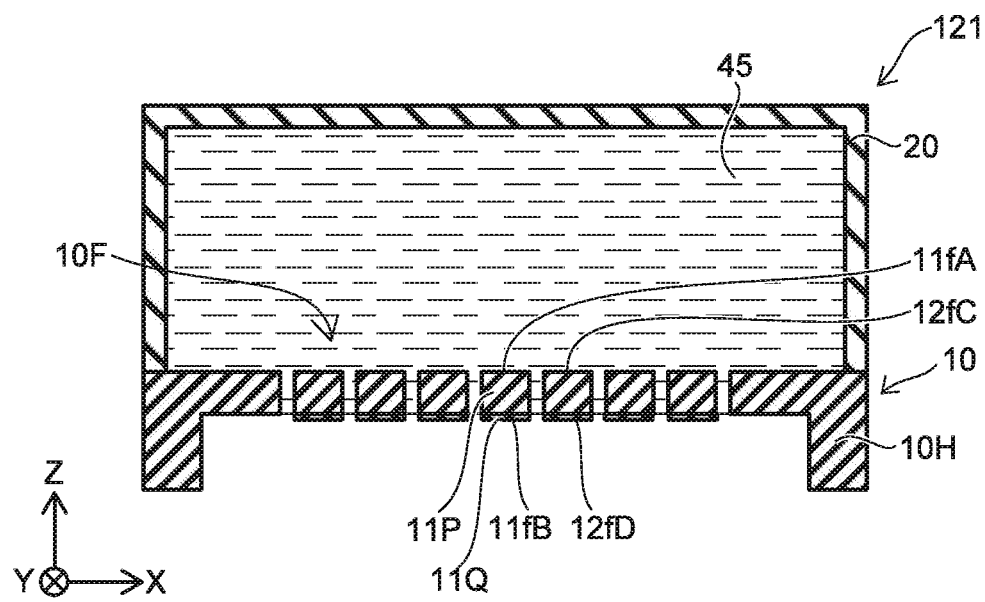
FIG. 10 is a schematic cross-sectional view illustrating a portion of a sensor according to the second embodiment.

FIG. 10 is a schematic cross-sectional view illustrating a portion of a sensor according to the second embodiment.

FIG. 10 corresponds to FIG. 1B. As shown in FIG. 10, the first deformable part 11 includes a first layer 11P and a second layer 11Q in the sensor 121 according to the embodiment. The first layer 11P is between the second layer 11Q and the liquid 45. For example, the first layer 11P does not include fluorine, and the second layer 11Q includes fluorine. The concentration of fluorine included in the first layer 11P is less than the concentration of fluorine included in the second layer 11Q. The second layer 11Q is a region that includes fluorine. Regions that include fluorine may be provided in the multiple deformable parts. For example, the first layer 11P does not include a fluorine compound, and the second layer 11Q includes a fluorine compound. Or, the concentration of a fluorine compound included in the first layer 11P is less than the concentration of a fluorine compound included in the second layer 11Q.

The thickness (e.g., the length along the Z-axis direction) of the second layer 11Q is, for example, not less than 1 nm and not more than 200 nm.

For example, the surface of the first layer 11P corresponds to the first surface 11fA. The surface of the second layer 11Q corresponds to the second surface 11fB.

Figure 11:
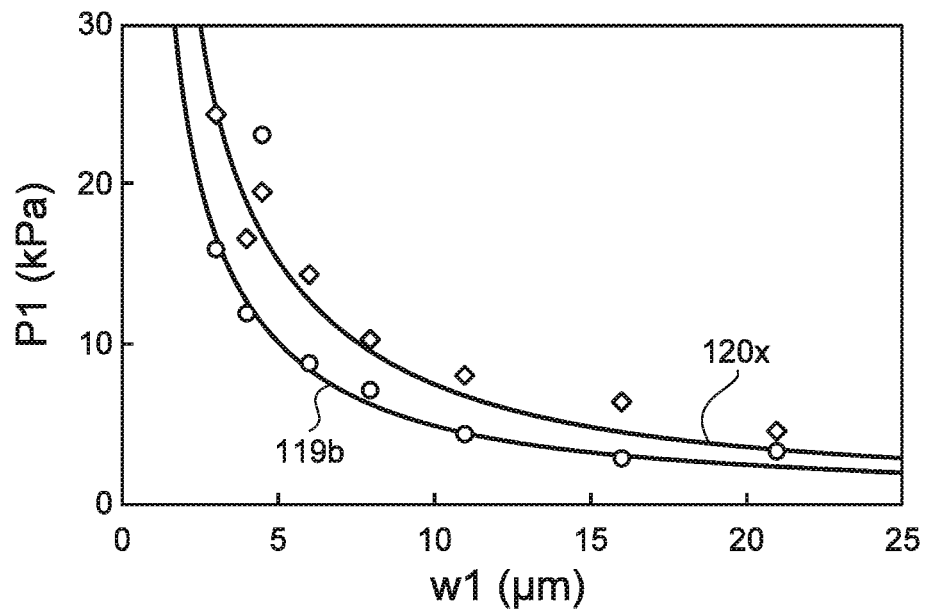
FIG. 11 is a graph illustrating sensor characteristics.

FIG. 11 is a graph illustrating sensor characteristics.

The horizontal axis of FIG. 11 is a width w1 (μm) of the slit 10s. The vertical axis is a leak pressure P1 (kPa). The leak pressure P1 corresponds to the pressure applied to the second structure body 20 when the outflow of the liquid 45 from the slit 10s starts. It is difficult for the liquid 45 to outflow as the leak pressure P1 increases.

FIG. 11 illustrates experiment results relating to a sensor 120x and a sensor 119b. In the sensor 120x, processing of the second surface 11fB is performed using $C_4F_8$ gas. $C_4F_8$ gas processing is not performed for the sensor 119b. Otherwise, the configuration of the sensor 119b is the same as the configuration of the sensor 120x.

As shown in FIG. 11, compared to the sensor 119b, a large leak pressure P1 is obtained for the sensor 120x. The outflow of the liquid 45 can be suppressed in the sensor 120x. A sensor can be provided in which the characteristics can be stable.

Figure 12:
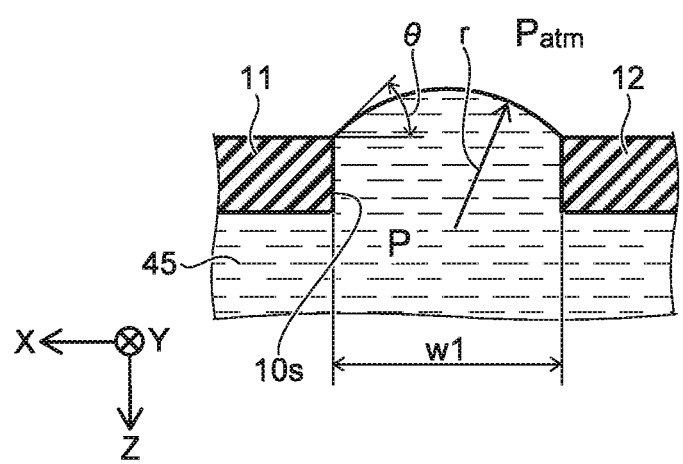
FIG. 12 is a schematic view illustrating sensor characteristics.

FIG. 12 is a schematic view illustrating sensor characteristics.

As shown in FIG. 12, the slit 10s is provided between the first deformable part 11 and the second deformable part 12.

The pressure that is applied to the liquid 45 is taken as "p". Atmospheric pressure is taken as "$p_{atm}$". The surface tension of the liquid 45 is taken as "γ". The angle between the medium (the deformable part) that contacts the liquid 45 is taken as "θ". The curvature radius of the liquid 45 is taken as "r". The width of the slit 10s (the gap) is taken as w1.

For example, the relationships of the following first and second formulas hold.

$$p - p_{atm} = 2\gamma/r \qquad (1)$$

$$r = w1/(2 \sin \theta) \qquad (2)$$

The advancing contact angle when the liquid 45 leaks from the slit 10s is taken as $\theta_{adv}$. In such a case, the relationship of the following third formula holds.

$$\theta > \theta_{adv} \qquad (3)$$

The condition of the pressure when the liquid 45 leaks from the slit 10s is represented by the following fourth formula.

$$p - p_{atm} > 2\gamma(\sin \theta_{adv})/w1 \qquad (4)$$

Accordingly, the limit of the leak pressure can be increased by increasing the advancing contact angle.

The configuration according to the second embodiment and the configuration according to the first embodiment are applicable in combination with each other.

Third Embodiment

In the following description of a sensor according to a third embodiment, portions similar to those of the sensor according to the first embodiment are omitted as appropriate.

Figure 13A:
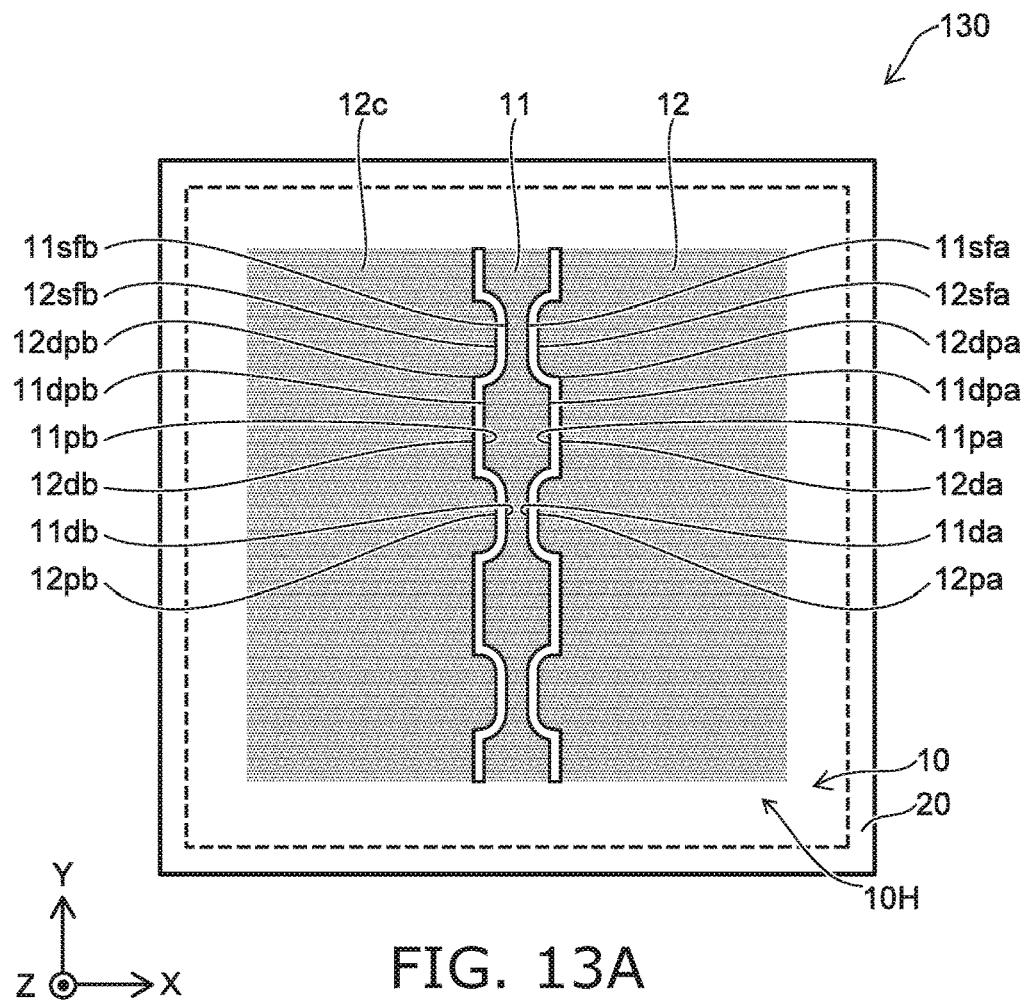
FIGS. 13A and 13B are schematic views illustrating a sensor according to a third embodiment.
Figure 13B:
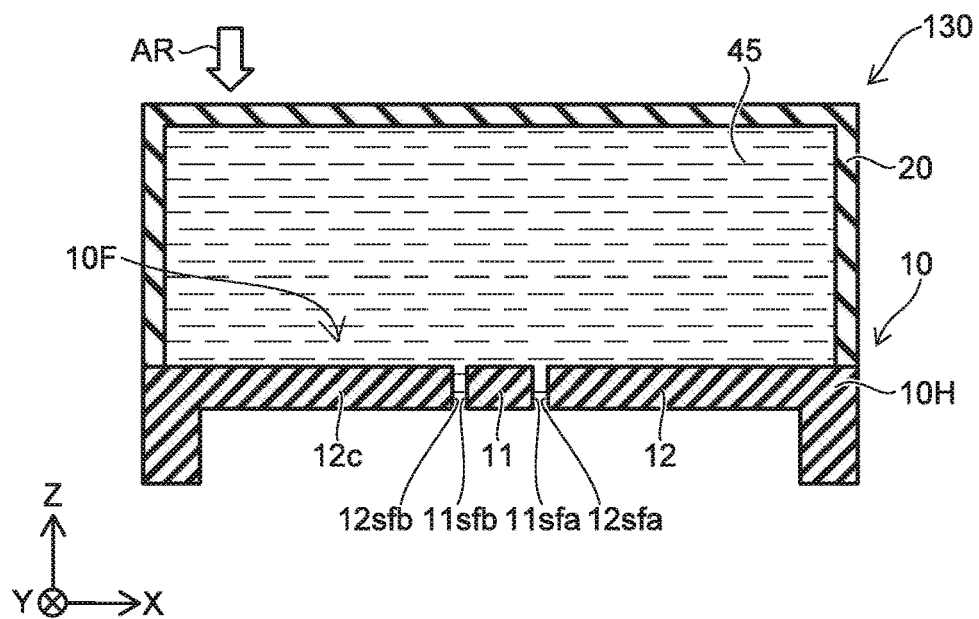

FIGS. 13A and 13B are schematic views illustrating the sensor according to the third embodiment. FIG. 13A is a plan view of a portion of the sensor when viewed along arrow AR of FIG. 13B. FIG. 13B is a cross-sectional view corresponding to a line A1-A2 cross section of FIG. 2B.

The sensor 130 according to the embodiment includes the first structure body 10 and the second structure body 20. The sensor 130 may further include the detector 30 (referring to FIG. 2A).

The first structure body 10 includes the supporter 10H and the multiple deformable parts. The multiple deformable parts include, for example, the first deformable part 11, the second deformable part 12, etc. The first deformable part 11 is supported by the supporter 10H. The second deformable part 12 is supported by the supporter 10H. For example, the second deformable part 12 extends along the first deformable part 11.

The second structure body 20 is connected to the first structure body 10. The liquid 45 is provided between the first structure body 10 and the second structure body 20.

In the example as well, the detector 30 outputs a signal corresponding to the deformation of at least one of the first deformable part 11 or the second deformable part 12.

As shown in FIG. 13A, the first deformable part 11 includes a first side surface 11sfa. The first side surface 11sfa faces the second deformable part 12. The first side surface 11sfa crosses the direction from the first deformable part 11 toward the second deformable part 12. The first side surface 11sfa includes a first unevenness 11dpa.

The second deformable part 12 includes a second side surface 12sfa. The second side surface 12sfa faces the first deformable part 11. The second side surface 12sfa crosses the direction from the first deformable part 11 toward the second deformable part 12. The second side surface 12sfa includes a second unevenness 12dpa. The second unevenness 12dpa extends along the first unevenness 11dpa.

For example, the first unevenness 11dpa includes a first protrusion 11pa and a first depression 11da. The second unevenness 12dpa includes a second protrusion 12pa and a second depression 12da. The second depression 12da faces the first protrusion 11pa. The second protrusion 12pa faces the first depression 11da.

The first deformable part 11 includes a first counter side surface 11sfb. The first counter side surface 11sfb faces the second counter deformable part 12c. The first counter side surface 11sfb crosses the direction from the first deformable part 11 toward the second counter deformable part 12c. The first counter side surface 11sfb includes a first counter unevenness 11dpb.

The second counter deformable part 12c includes a second counter side surface 12sfb. The second counter side surface 12sfb faces the first deformable part 11. The second counter side surface 12sfb crosses the direction from the first deformable part 11 toward the second counter deformable part 12c. The second counter side surface 12sfb includes a second counter unevenness 12dpb. The second counter unevenness 12dpb extends along the first counter unevenness 11dpb.

For example, the first counter unevenness 11dpb includes a first counter protrusion 11pb and a first counter depression 11db. The second counter unevenness 12dpb includes a second counter protrusion 12pb and a second counter depression 12db. The second counter depression 12db faces the first counter protrusion 11pb. The second counter protrusion 12pb faces the first counter depression 11db.

In the sensor 130, for example, the deformable part includes a wide portion and a narrow portion. The deformation of the deformable part is easier. For example, the outflow of the liquid 45 from the gap can be suppressed. For example, a sensor can be provided in which the characteristics can be stable.

Figure 14:
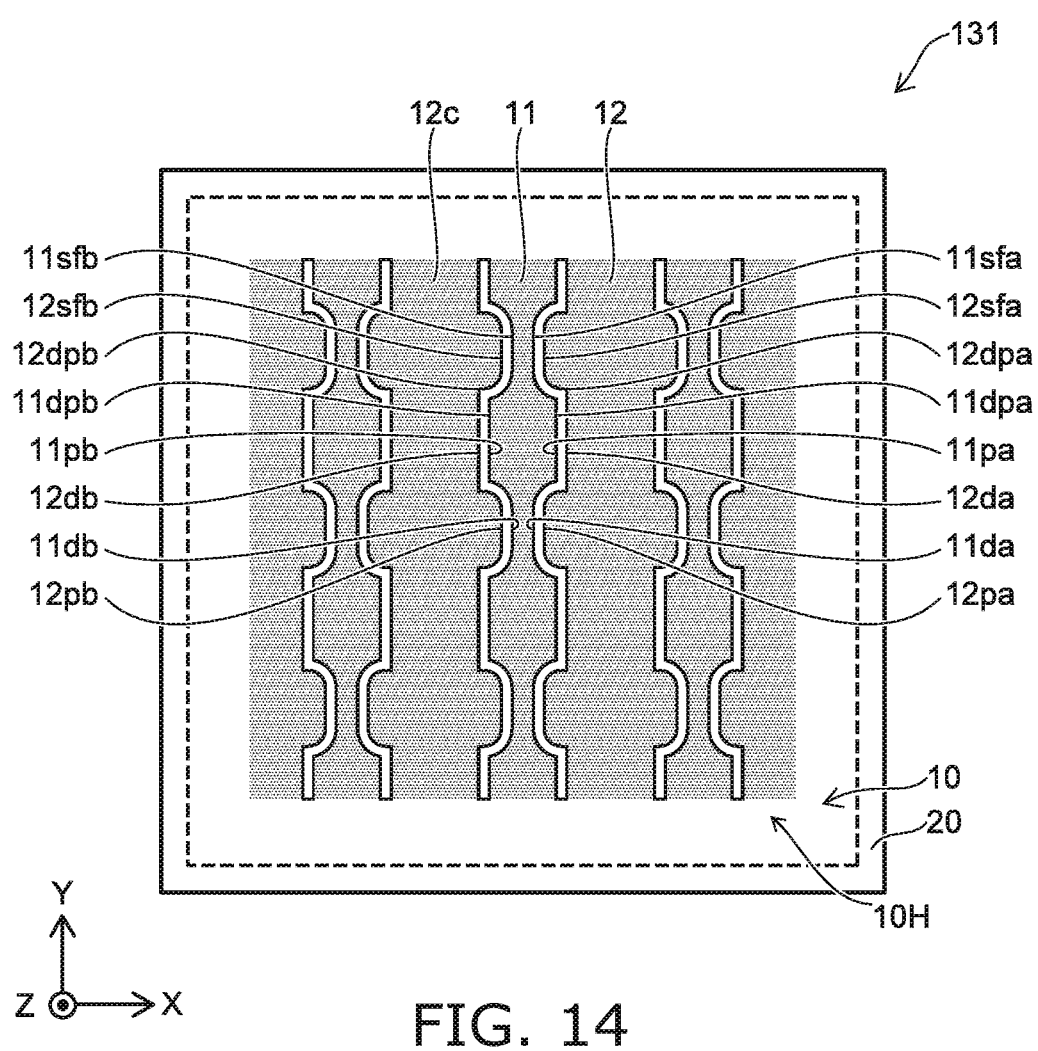
FIG. 14 is a schematic plan view illustrating a sensor according to the third embodiment.

FIG. 14 is a schematic plan view illustrating a sensor according to the third embodiment.

In the sensor 131 according to the embodiment, multiple sets of the first deformable part 11, the second deformable part 12, and the second counter deformable part 12c may be provided.

In the sensor 131 as well, the side surfaces of the multiple deformable parts include unevennesses.

Figure 15:
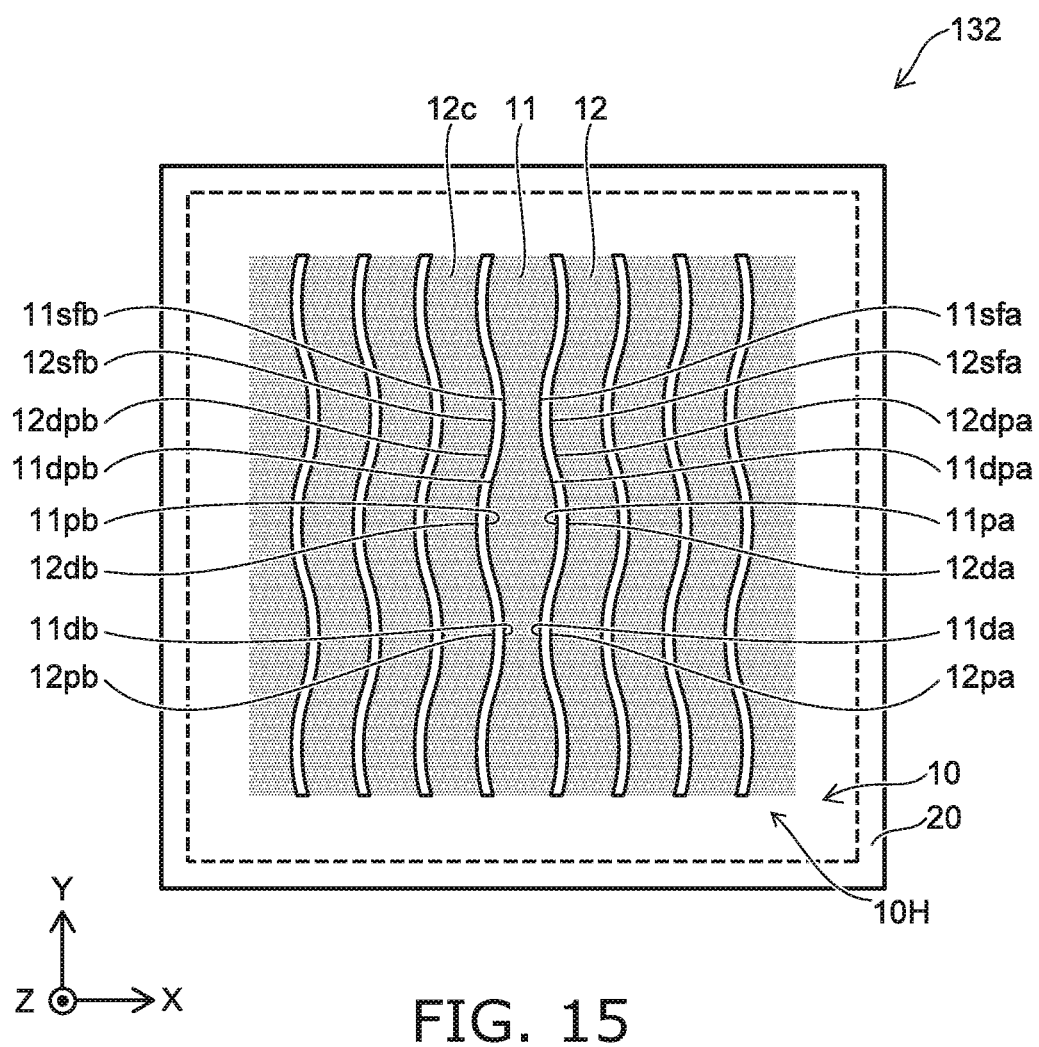
FIG. 15 is a schematic plan view illustrating a sensor according to the third embodiment.

FIG. 15 is a schematic plan view illustrating a sensor according to the third embodiment.

In the sensor 132 according to the embodiment, multiple sets of the first deformable part 11, the second deformable part 12, and the second counter deformable part 12c may be provided. In the sensor 132 as well, the side surfaces of the multiple deformable parts include unevennesses. The unevennesses may have continuously curved wave-like shapes. At least a portion of the unevennesses may include straight lines (planes) (FIG. 14, etc.). In the sensors 131 and 132 as well, the deformation of the deformable parts is easier. For example, the outflow of the liquid 45 from the gap can be suppressed. For example, a sensor can be provided in which the characteristics can be stable.

For example, problems that accompany the aging of structural components such as bridges, etc., are becoming apparent. It is desirable to develop technology for monitoring the state of structural components. For example, there is technology that detects the damage of a structural component by using an acoustic emission (AE) technique. In such technology, for example, an elastic wave that is generated due to the occurrence of an internal crack or the propagation of an internal crack is detected by a highly-sensitive sensor.

Acoustic emission is, for example, an elastic wave generated due to the propagation of a fatigue crack of a material. In an AE technique, the elastic wave is detected as a voltage signal (an AE signal) by the AE sensor. The AE sensor is, for example, a sensor that uses a piezoelectric element such as a PZT, etc.

For example, there is also a MEMS (Micro Electro Mechanical Systems)-type AE sensor. In the MEMS-type AE sensor, a liquid is provided to seal the gap formed between a cantilever and a frame. The liquid is held in a liquid holding region to be within a finite range. Due to the liquid, the cantilever vibrates along a capillary wave of the liquid. Thereby, the sensor operates as a wide-bandwidth and highly-sensitive vibration sensor.

There are cases where the liquid leaks from the gap. For example, an impact is applied to the sensor when the sensor is dropped, etc. In such a case, the gap instantaneously enlarges. Thereby, there are cases where the liquid leaks. When the liquid leaks from the gap, it is difficult to obtain a sufficient capability of the sensor.

In the embodiments, for example, the outflow of the liquid 45 can be suppressed. For example, the impact resistance of the AE sensor can be improved. For example, stable characteristics are easily obtained.

The reference numerals of the drawings are as follows.
10 first structure body
10F membrane part
10H supporter
10N Nth deformable part
10NL Nth length
10NW Nth width
10NZ Nth thickness 10(N−1) (N−1)th deformable part
10(N−1)L (N−1)th length
10(N−1)W (N−1)th width
10(N−1)Z (N−1)th thickness
10(N−1)c (N−1)th counter deformable part
10(N−1)cL (N−1)th counter length
10(N−1)cW (N−1)th counter width
10(N−1)cZ (N−1)th counter thickness
10Nc Nth counter deformable part
10NcL Nth counter length
10NcW Nth counter width
10NcZ Nth counter thickness
10Ncp Nth counter end portion
10Ncq Nth counter other-end portion
10Np Nth end portion
10Nq Nth other-end portion
10(N−1)p (N−1)th counter end portion
10(N−1)q (N−1)th counter other-end portion
10s slit
10SL hole
10x membrane part
11, 12, 13 first, second, third deformable parts
11L, 12L first, second lengths
11W, 12W first, second widths
11Z, 12Z first, second thicknesses
11da first depression
11db first counter depression
11dpa first unevenness
11dpb first counter unevenness
11fA, 11fB first, second surfaces
11p, 12p first, second end portions
11q, 12q first, second other-end portions
11pa first protrusion
11pb first counter protrusion
11sa, 11sb, 12sa, 12sb side portions
11sfa first side surface
11sfb first counter side surface
12c, 13c second, third counter deformable parts
12cL second counter length
12cW second counter width
12cZ second counter thickness
12da second depression
12db second counter depression
12dpa second unevenness
12dpb second counter unevenness
12fC, 12fD third, fourth surfaces
12pa second protrusion
12pb second counter protrusion
12sfa second side surface
12sfb second counter side surface
20 second structure body
30 detector
35e, 35f first, second electrodes
45 liquid
110, 110x, 111, 112, 113, 114, 119, 119b, 120, 120x, 121, 130,
131, 132 sensors
AR arrow
DP parameter
GP gap
P1 pressure
w1 width The embodiments may include, for example, the following configurations (e.g., technological proposals).

Configuration 1
A sensor, comprising:
a first structure body including
a supporter,
a first deformable part supported by the supporter, the first deformable part having a first length, a first width, and a first thickness, the first length being greater than the first width and greater than the first thickness, and
a second deformable part supported by the supporter, the second deformable part extending along the first deformable part and having at least one of a second length less than the first length, a second width greater than the first width, a second thickness greater than the first thickness, a second Young's modulus greater than a first Young's modulus of the first deformable part, or a second spring constant greater than a first spring constant of the first deformable part, the second length being greater than the second width and greater than the second thickness;
a second structure body connected to the first structure body, a liquid being provided between the first structure body and the second structure body; and
a detector outputting a signal corresponding to a deformation of at least one of the first deformable part or the second deformable part.

Configuration 2
The sensor according to Configuration 1, wherein
the first length is a length of the first deformable part along a first direction,
the second length is a length of the second deformable part along the first direction,
a second direction from the first deformable part toward the second deformable part crosses the first direction,
the first width is a length of the first deformable part along the second direction,
the second width is a length of the second deformable part along the second direction,
a third direction crosses a plane including the first and second directions,
the first thickness is a length of the first deformable part along the third direction, and
the second thickness is a length of the second deformable part along the third direction.

Configuration 3
The sensor according to Configuration 2, wherein
the first deformable part includes two first side portions along the first direction,
the two first side portions are separated from the supporter and separated from the second deformable part,
the second deformable part includes two second side portions along the first direction, and
the two second side portions are separated from the supporter and separated from the first deformable part.

Configuration 4
The sensor according to any one of Configurations 1 to 3, wherein
the first structure body has a slit provided between the first deformable part and the second deformable part, and a slit provided between the second deformable part and the supporter.

Configuration 5
The sensor according to any one of Configurations 2 to 4, wherein
a first end portion of the first deformable part is supported by the supporter,
a first other-end portion of the first deformable part is supported by the supporter, a second end portion of the second deformable part is supported by the supporter, and a second other-end portion of the second deformable part is supported by the supporter.

Configuration 6

The sensor according to Configuration 5, wherein a direction from the first other-end portion toward the first end portion is along the first direction.

Configuration 7

The sensor according to any one of Configurations 1 to 6, wherein the first structure body further includes a second counter deformable part supported by the supporter, the second counter deformable part extends along the first deformable part, at least a portion of the first deformable part is provided between the second deformable part and the second counter deformable part, the second counter deformable part has at least one of a second counter length less than the first length, a second counter width greater than the first width, or a second counter thickness greater than the first thickness, and the second counter length is greater than the second counter width and greater than the second counter thickness.

Configuration 8

The sensor according to any one of Configurations 1 to 7, wherein the first structure body further includes an Nth deformable part supported by the supporter, N is an integer of 3 or more, a (N−1)th deformable part is between the first deformable part and the Nth deformable part, the Nth deformable part extends along the (N−1)th deformable part, the (N−1)th deformable part has a (N−1)th length, a (N−1)th width, and a (N−1)th thickness, the (N−1)th length is greater than the (N−1)th width and greater than the (N−1)th thickness, the Nth deformable part has at least one of an Nth length less than the (N−1)th length, an Nth width greater than the (N−1)th width, or an Nth thickness greater than the (N−1)th thickness, and the Nth length is greater than the Nth width and greater than the Nth thickness.

Configuration 9

The sensor according to Configuration 8, wherein the first structure body further includes an Nth counter deformable part supported by the supporter, the first deformable part is between the Nth deformable part and the Nth counter deformable part, a (N−1)th counter deformable part is between the first deformable part and the Nth counter deformable part, the Nth counter deformable part extends along the (N−1)th counter deformable part, the (N−1)th counter deformable part has a (N−1)th counter length, a (N−1)th counter width, and a (N−1)th counter thickness, the (N−1)th counter length is greater than the (N−1)th counter width and greater than the (N−1)th counter thickness, the Nth counter deformable part has at least one of an Nth counter length less than the (N−1)th counter length, an Nth counter width greater than the (N−1)th counter width, or an Nth counter thickness greater than the (N−1)th counter thickness, and the Nth counter length is greater than the Nth counter width and greater than the Nth counter thickness.

Configuration 10

The sensor according to Configuration 9, wherein a shape formed of boundaries between the supporter and the first to Nth deformable parts and boundaries between the supporter and the second to Nth counter deformable parts is substantially circular.

Configuration 11

The sensor according to any one of Configurations 1 to 10, wherein the deformation corresponds to a sound wave applied to the second structure body.

Configuration 12

The sensor according to any one of Configurations 1 to 11, wherein the first length is not less than 2 times and not more than 100 times the first width.

Configuration 13

The sensor according to any one of Configurations 1 to 12, wherein the first length is not less than 100 times and not more than 3000 times the first thickness.

Configuration 14

The sensor according to any one of Configurations 1 to 13, wherein the first deformable part includes a first surface and a second surface, the first surface is between the second surface and the liquid, and a contact angle of the second surface with the liquid is greater than a contact angle of the first surface with the liquid.

Configuration 15

The sensor according to any one of Configurations 1 to 14, wherein the first deformable part includes a first layer and a second layer, the first layer is between the second layer and the liquid, and the first layer does not include fluorine and the second layer includes fluorine, or a concentration of fluorine included in the first layer is less than a concentration of fluorine included in the second layer.

Configuration 16

The sensor according to any one of Configurations 14 to 15, wherein the second deformable part includes a third surface and a fourth surface, the third surface is between the fourth surface and the liquid, and a contact angle of the fourth surface with the liquid is greater than a contact angle of the third surface with the liquid.

Configuration 17

A sensor, comprising:

a first structure body including a supporter, and a first deformable part supported by the supporter; and a second structure body connected to the first structure body a liquid being provided between the first structure body and the second structure body, the first deformable part including a first surface and a second surface, the first surface being between the second surface and the liquid a contact angle of the second surface with the liquid being greater than a contact angle of the first surface with the liquid.

Configuration 18

The sensor according to Configuration 17, wherein
the first deformable part includes a first layer and a second layer,
the first layer is between the second layer and the liquid, and
the first layer does not include fluorine and the second layer includes fluorine, or a concentration of fluorine included in the first layer is less than a concentration of fluorine included in the second layer.

Configuration 19

A sensor, comprising:
a first structure body including
a supporter,
a first deformable part supported by the supporter, and
a second deformable part supported by the supporter, the second deformable part extending along the first deformable part;
a second structure body connected to the first structure body, a liquid being provided between the first structure body and the second structure body; and
a detector outputting a signal corresponding to a deformation of at least one of the first deformable part or the second deformable part,
the first deformable part including a first side surface facing the second deformable part,
the first side surface including a first unevenness,
the second deformable part including a second side surface facing the first deformable part,
the second side surface including a second unevenness along the first unevenness.

Configuration 20

The sensor according to Configuration 19, wherein
the first unevenness includes a first protrusion and a first depression,
the second unevenness includes a second depression and a second protrusion,
the second depression faces the first protrusion, and
the second protrusion faces the first depression.

Configuration 21

The sensor according to any one of Configurations 1 to 20, wherein
the signal includes at least one of
a change of a resistance occurring according to the deformation,
a change of a voltage of piezoelectricity occurring according to the deformation, or
a change of an electrostatic capacitance occurring according to the deformation.

Configuration 22

The sensor according to any one of Configurations 1 to 21, wherein
the detector includes:
a first electrode connected to a portion of the first deformable part; and
a second electrode connected to an other portion of the first deformable part.

According to the embodiments, a sensor can be provided in which the characteristics can be stable.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in semiconductor memory devices such as semiconductor layers, memory strings, memory cells, device isolation insulating layers, alignment mark units, mark unit semiconductor layers, mark unit insulating layers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:
1. A sensor, comprising:
a first structure body including
a supporter,
a first deformable part supported by the supporter, and
a second deformable part supported by the supporter, the second deformable part having at least one of a second length less than a first length of the first deformable part, a second width greater than a first width of the first deformable part, a second thickness greater than a first thickness of the first deformable part, a second Young's modulus greater than a first Young's modulus of the first deformable part, or a second spring constant greater than a first spring constant of the first deformable part;
a second structure body connected to the first structure body, a liquid being provided between the first structure body and the second structure body; and
a detector outputting a signal corresponding to a deformation of at least one of the first deformable part or the second deformable part,
the first structure body further including an Nth deformable part supported by the supporter,
N being an integer of 3 or more,
a (N−1)th deformable part being between the first deformable part and the Nth deformable part,
the Nth deformable part extending along the (N−1)th deformable part,
the (N−1)th deformable part having a (N−1)th length, a (N−1)th width, and a (N−1)th thickness,
the (N−1)th length being greater than the (N−1)th width and greater than the (N−1)th thickness,
the Nth deformable part having at least one of an Nth length less than the (N−1)th length, an Nth width greater than the (N−1)th width, or an Nth thickness greater than the (N−1)th thickness, the Nth length being greater than the Nth width and greater than the Nth thickness.

2. The sensor according to claim 1, wherein
the first length is a length of the first deformable part along a first direction,
the second length is a length of the second deformable part along the first direction,
a second direction from the first deformable part toward the second deformable part crosses the first direction,
the first width is a length of the first deformable part along the second direction,
the second width is a length of the second deformable part along the second direction,
a third direction crosses a plane including the first and second directions,
the first thickness is a length of the first deformable part along the third direction, and
the second thickness is a length of the second deformable part along the third direction.

3. The sensor according to claim 2, wherein
the first deformable part includes two first side portions along the first direction,
the two first side portions are separated from the supporter and separated from the second deformable part,
the second deformable part includes two second side portions along the first direction, and
the two second side portions are separated from the supporter and separated from the first deformable part.

4. The sensor according to claim 2, wherein
a first end portion of the first deformable part is supported by the supporter,
a first other-end portion of the first deformable part is supported by the supporter,
a second end portion of the second deformable part is supported by the supporter, and
a second other-end portion of the second deformable part is supported by the supporter.

5. The sensor according to claim 4, wherein
a direction from the first other-end portion toward the first end portion is along the first direction.

6. The sensor according to claim 5, wherein
the first structure body has a slit provided between the first deformable part and the second deformable part,
the first deformable part has a first side surface being continuous from the first end portion to the first other-end portion,
a direction from the second other-end portion toward the second end portion is along the first direction,
the second deformable part has a second side surface being continuous from the second end portion to the second other-end portion, and
the slit is a gap between the first side surface and the second side surface.

7. The sensor according to claim 1, wherein
the first structure body has a slit provided between the first deformable part and the second deformable part, and a slit provided between the second deformable part and the supporter.

8. The sensor according to claim 1, wherein
the first structure body further includes a second counter deformable part supported by the supporter,
the second counter deformable part extends along the first deformable part,
at least a portion of the first deformable part is provided between the second deformable part and the second counter deformable part,
the second counter deformable part has at least one of a second counter length less than the first length, a second counter width greater than the first width, a second counter thickness greater than the first thickness, a second counter Young's modulus that is greater than the first Young's modulus, or a second counter spring constant that is greater than the first spring constant, and
the second counter length is greater than the second counter width and greater than the second counter thickness.

9. The sensor according to claim 8, wherein
the first structure body further includes an Nth counter deformable part supported by the supporter,
the first deformable part is between the Nth deformable part and the Nth counter deformable part,
a (N−1)th counter deformable part is between the first deformable part and the Nth counter deformable part,
the Nth counter deformable part extends along the (N−1)th counter deformable part,
the (N−1)th counter deformable part has a (N−1)th counter length, a (N−1)th counter width, and a (N−1)th counter thickness,
the (N−1)th counter length is greater than the (N−1)th counter width and greater than the (N−1)th counter thickness,
the Nth counter deformable part has at least one of an Nth counter length less than the (N−1)th counter length, an Nth counter width greater than the (N−1)th counter width, or an Nth counter thickness greater than the (N−1)th counter thickness, and
the Nth counter length is greater than the Nth counter width and greater than the Nth counter thickness.

10. The sensor according to claim 9, wherein
a shape formed of boundaries between the supporter and the first to Nth deformable parts and boundaries between the supporter and the second to Nth counter deformable parts is substantially circular.

11. The sensor according to claim 1, wherein
the deformation corresponds to a sound wave applied to the second structure body.

12. The sensor according to claim 1, wherein
the first length is not less than 2 times and not more than 100 times the first width.

13. The sensor according to claim 1, wherein
the first length is not less than 100 times and not more than 3000 times the first thickness.

14. The sensor according to claim 1, wherein
the first deformable part includes a first surface and a second surface,
the first surface is between the second surface and the liquid, and
a contact angle of the second surface with the liquid is greater than a contact angle of the first surface with the liquid.

15. The sensor according to claim 14, wherein
the second deformable part includes a third surface and a fourth surface,
the third surface is between the fourth surface and the liquid, and
a contact angle of the fourth surface with the liquid is greater than a contact angle of the third surface with the liquid.

16. The sensor according to claim 1, wherein
the first deformable part includes a first layer and a second layer, the first layer is between the second layer and the liquid, and the first layer does not include fluorine and the second layer includes fluorine, or a concentration of fluorine included in the first layer is less than a concentration of fluorine included in the second layer.

17. A sensor, comprising:
a first structure body including
  a supporter, and
  a first deformable part supported by the supporter; and
a second structure body connected to the first structure body,
a liquid being provided between the first structure body and the second structure body,
the first deformable part including a first surface and a second surface,
the first surface being between the second surface and the liquid,
a contact angle of the second surface with the liquid being greater than a contact angle of the first surface with the liquid.

18. The sensor according to claim 17, wherein
the first deformable part includes a first layer and a second layer,
the first layer is between the second layer and the liquid, and
the first layer does not include fluorine and the second layer includes fluorine, or a concentration of fluorine included in the first layer is less than a concentration of fluorine included in the second layer.

19. The sensor according to claim 17, wherein
the first structure body further includes a second deformable part and a second counter deformable part,
the second deformable part is supported by the supporter and extends along the first deformable part,
the second counter deformable part is supported by the supporter and extends along the first deformable part, and
at least a portion of the first deformable part is provided between the second deformable part and the second counter deformable part.

20. A sensor, comprising:
a first structure body including
  a supporter,
  a first deformable part supported by the supporter, and
  a second deformable part supported by the supporter, the second deformable part extending along the first deformable part;
a second structure body connected to the first structure body, a liquid being provided between the first structure body and the second structure body; and
a detector outputting a signal corresponding to a deformation of at least one of the first deformable part or the second deformable part,
the first deformable part including a first side surface facing the second deformable part,
the first side surface including a first unevenness,
the second deformable part including a second side surface facing the first deformable part,
the second side surface including a second unevenness along the first unevenness,
the first structure body further including an Nth deformable part supported by the supporter,
N being an integer of 3 or more,
a (N−1)th deformable part being between the first deformable part and the Nth deformable part,
wherein
  the first structure body further includes a second counter deformable part,
  the second counter deformable part is supported by the supporter and extends along the first deformable part, and
  at least a portion of the first deformable part is provided between the second deformable part and the second counter deformable part.

21. The sensor according to claim 20, wherein
the first unevenness includes a first protrusion and a first depression,
the second unevenness includes a second depression and a second protrusion,
the second depression faces the first protrusion, and
the second protrusion faces the first depression.

* * * * *